United States Patent
Bates et al.

(10) Patent No.: US 8,312,473 B2
(45) Date of Patent: Nov. 13, 2012

(54) SPECIFYING PARAMETERS FOR SELECTIVE RETURN TO AN INVOKER

(75) Inventors: John Paul Bates, Redwood City, CA (US); Payton R. White, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 1482 days.

(21) Appl. No.: 10/832,917

(22) Filed: Apr. 26, 2004

(65) Prior Publication Data

US 2005/0240937 A1    Oct. 27, 2005

(51) Int. Cl.
*G06F 9/46* (2006.01)
(52) U.S. Cl. .......... 719/315; 718/108; 719/330
(58) Field of Classification Search .......... 709/201–207, 709/217–219; 717/165–167; 718/106; 719/315, 719/316, 330–332
See application file for complete search history.

(56) References Cited

U.S. PATENT DOCUMENTS

| | | | | |
|---|---|---|---|---|
| 6,321,273 | B1 * | 11/2001 | Schofield | 719/315 |
| 6,321,275 | B1 * | 11/2001 | McQuistan et al. | 719/330 |
| 6,389,484 | B1 * | 5/2002 | Lim et al. | 719/316 |
| 6,487,607 | B1 * | 11/2002 | Wollrath et al. | 719/330 |
| 6,553,438 | B1 * | 4/2003 | Coffman et al. | 710/52 |
| 6,910,215 | B1 * | 6/2005 | Diamanti et al. | 719/313 |
| 7,047,525 | B2 * | 5/2006 | Prunty et al. | 717/137 |
| 7,055,143 | B2 * | 5/2006 | Ringseth et al. | 717/143 |
| 7,353,521 | B1 * | 4/2008 | Jin | 719/330 |
| 2002/0099738 | A1 * | 7/2002 | Grant | 707/513 |
| 2004/0226030 | A1 * | 11/2004 | Marvin et al. | 719/328 |
| 2005/0268309 | A1 * | 12/2005 | Krishnaswamy et al. | 719/330 |

OTHER PUBLICATIONS

Wei et al., "*The Design of a Stub Generator for Heterogeneous RPC Systems*", Mar. 11, 1991, Journal of Parallel and Distributed Computing, vol. 11, No. 3, pp. 188-197, XP000201905, ISSN: 0743-7315, Duluth, MN.
Tham et al., "*Retargetable Stub Generator for a Remote Procedure Call Facility*", Jul./Aug. 1990, Computer Communicatons, vol. 13, No. 6, pp. 323-329, XP000136891, ISSN: 0140-3664, London, GB.
Brunsch et al., "*Designing an Efficient and Scalable Server-side Asynchrony Model for CORBA*", Aug. 1, 2006, vol. 36, No. 8, Sigplan Notices ACM USA, pp. 223-229, XP002339222, ISSN: 0362-1340, Irvine, CA.
P. Soares, "*On Remote Procedure Call*", IBM Center for Advanced Studies Conf., Proceedings of '92 Conf. of the Centre for Advanced Studies on Collaborative Research, vol. 2, 1992, pp. 215-267, XP002339223, New York, NY.

* cited by examiner

*Primary Examiner* — Charles E Anya
(74) *Attorney, Agent, or Firm* — Martine Penilla Group, LLP (57) ABSTRACT

Provided is a method and an apparatus for selectively returning parameters from an invoked object. Specifically, a requestor can invoke an object by transmitting a message. The message can include specified return parameters from an interface, such as an interface definition language (IDL). Alternatively, an object stub locally accessible by the requester can be invoked. The object stub, similar to the IDL, can specify the parameters to return. After the execution of a method in the invoked object, the requestor receives the return parameters or a subset of the return parameters previously selected.

9 Claims, 7 Drawing Sheets

SPECIFYING PARAMETERS FOR SELECTIVE RETURN TO AN INVOKER

BACKGROUND

1. Field of the Invention

The present invention relates to invoking objects in a distributed computing environment, and more specifically to selecting parameters for return to an invoker in the distributed computing environment.

2. Description of the Related Art

Typically, an object contains data and methods that operate on the data. To invoke the methods of the object, a requester can send a message to the object to execute the methods. For example, in a Common Object Request Broker Architecture (CORBA) and Internet Communications Engine (ICE), either of which can be used as middleware on a network, a client computer operating the requestor can send messages to the object on another computer in the network regardless of the programming language the object was written in.

An example of the message can be the invocation of a method to insert a value in a database. Specifically, in an employee database containing multiple records of employee information, a method to insert the last name of a new employee can be     void setLastName (inout "Bates," out, . . . , in) throw E1 E2

Thus, the message corresponding to the method format above is transmitted to an object to invoke the method setLastName. The string value, "Bates," is added to the employee database and upon completion, the method returns reply data to the requestor. For example, for the exemplary method above, the reply data will be associated with "inout," "out," and "throw." Some methods that have no reply data will return nothing to the requester. However, if there is reply data, then the reply data will always return to the requestor.

On a network, multiple invoked methods will return reply data. An aggregation of all the methods returning reply data increases network traffic and degrades overall network performance. Further, if the requestor invokes a method and does not want reply data, then the requestor has no option but to process the reply data upon arrival. By processing each and every reply data, the requestor may not operate efficiently.

Accordingly, what is needed is a method and an apparatus for invoking objects while having the capability to select the reply data returned to the requestor invoking the object, thereby reducing network bandwidth and optimizing requestor operation.

SUMMARY

Broadly speaking, the present invention is a method and an apparatus for selectively returning parameters from an invoked object in a distributed network. It should be appreciated that the present invention can be implemented in numerous ways, such as a process, an apparatus, a system, a device or a method on a computer readable medium. Several inventive embodiments of the present invention are described below.

In one embodiment, a method for invoking functions in a distributed object computing environment includes invoking a function associated with an object. The function includes a definition of selected parameters of a parameter list to be returned, such that the invoking causes the function of the object to be executed. Further, the method includes receiving only the selected parameters or a subset of the selected parameters from the object after completing the execution of the function.

In another embodiment, a method for executing requests from an invoker over a network includes receiving a request from the invoker, such that the request includes a parameter list that has identified return parameters. The method also includes executing the request and returning results from the execution of the request, such that only results associated with the identified return parameters or a subset of the identified return parameters are returned to the invoker.

In an embodiment of a process for invoking methods in a distributed object computing environment, the process includes specifying a method having a return list, such that the return list includes selected return parameters. The process also includes calling the method of an object for execution, and receiving callbacks from the method, such that the callbacks are limited to the selected return parameters or a subset of the selected return parameters identified in the return list.

In an embodiment of a system for invoking methods in a distributed object computing environment, the system includes a first computing device and a second computing device coupled together via a network connection. The system also includes a requestor executed by the first computing device, such that the requestor executes a method having a parameter list. The parameter list can identify selected return parameters. The system also includes an object associated with the method, such that the object is on the second computing device. Further, the method is capable of being executed and only returning the selected return parameters or a subset of the selected return parameters to the requestor.

In an embodiment of a computer program embodied on a computer readable medium for invoking methods in a distributed object computing environment, the program includes instructions for initiating a method by a requester and instructions for executing the method. The program also includes instructions for identifying selected parameters to return to the requestor and instructions for selectively returning identified parameters or a subset of the identified parameters to the requester.

In an embodiment of a system for invoking methods in a network, the system includes means for invoking a method associated with an object, such that the method includes a definition of selected parameters of a parameter list to be returned. Further, means for invoking the method causes the method of the object to be executed. The system also includes means for receiving only the selected parameters or a subset of the selected parameters from the object after completing the execution of the method.

Other aspects of the invention will become apparent from the following detailed description, taken in conjunction with the accompanying drawings, illustrating by way of example the principles of the invention.

BRIEF DESCRIPTION OF THE DRAWINGS

Embodiments of the invention may best be understood by reference to the following description taken in conjunction with the accompanying drawings in which.

DETAILED DESCRIPTION

The following embodiments describe operations and an apparatus for selectively returning parameters from an invoked object. The invoked object may be a remote object in a distributed network environment, such that the remote object has an executable function, called a method. When a requestor transmits a message to the remote object to execute the method, the method can return parameters previously identified for selective return to the requester. Further, the requester can specify that no parameters should be returned. It will be obvious, however, to one skilled in the art, that the present invention may be practiced without some or all of these specific details. In other instances, well known process operations have not been described in detail in order not to unnecessarily obscure the present invention.

Figure 1:
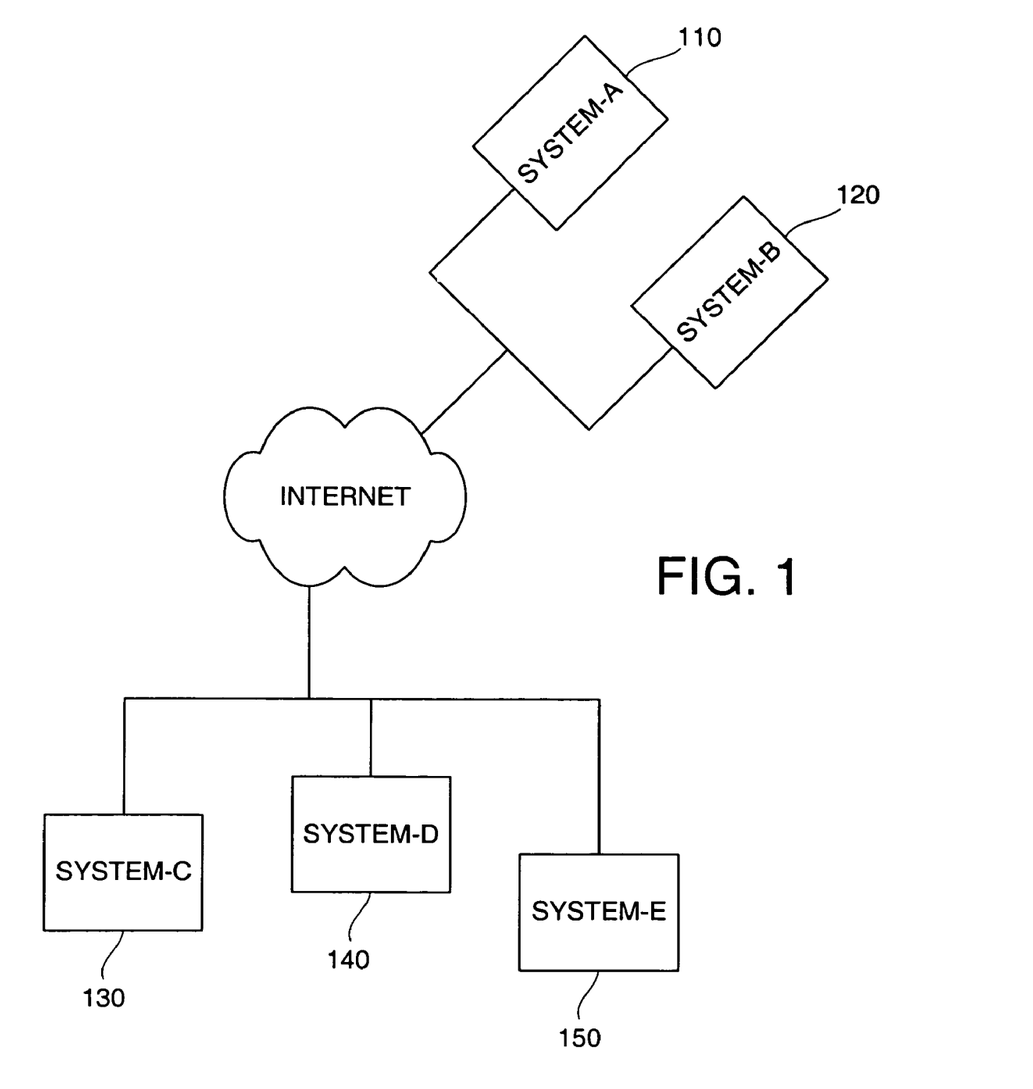
FIG. 1 is a diagram illustrating a distributed object computing environment, in accordance with an embodiment of the invention.

FIG. 1 is a diagram illustrating a distributed object computing environment, in accordance with an embodiment of the invention. For example, multiple systems in the distributed object computing environment can include a system-A 110, a system-B 120, a system-C 130, a system-D 140, and a system-E 150. Further, the systems can be connected in a network, such as an Internet or a local area network. However, any network type is possible, as long as the network facilitates communication between systems. On each system are objects and methods associated with the objects. Thus, messages can invoke methods associated with the objects by traveling throughout the network.

Messages can be transmitted asynchronously with or without underlying middleware. For example, middleware permits the formatting of messages and handles communication between the systems regardless of the system platform or programming language used to create the objects and methods. Moreover, the systems can be any type of computing system using any type of operating system. Exemplary systems can include desktop class machines, server class machines, game machines, game consoles, personal digital assistants (PDAs), and other mobile devices, as long as the systems can transmit and receive messages to execute methods associated with the objects.

Figure 2A:
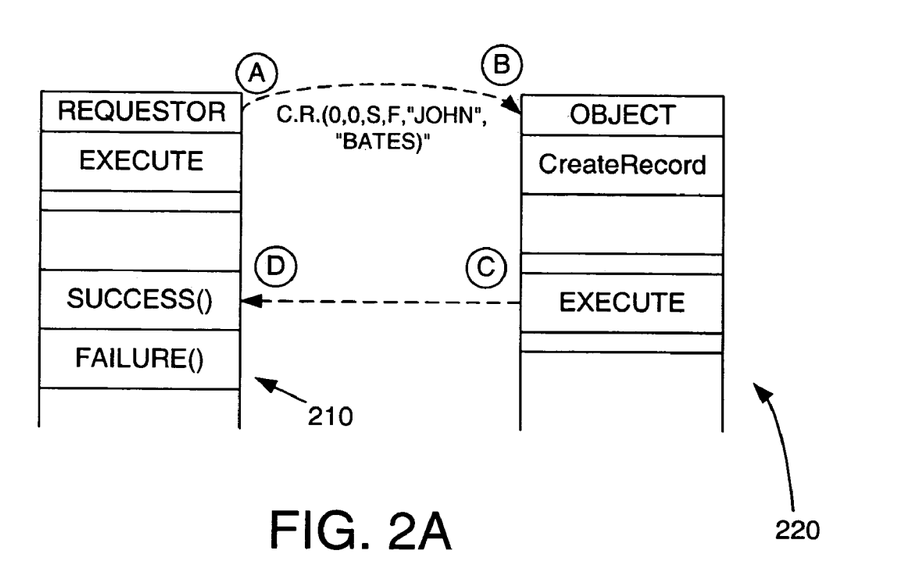
FIG. 2A is a diagram illustrating a requestor invoking a remote object, in accordance with an embodiment of the invention.

FIG. 2A is a diagram illustrating a requestor invoking a remote object, in accordance with an embodiment of the invention. In one exemplary embodiment of system to system communication, a message can be "c.r.(0, 0, S, F, "John," "Bates")" where "c.r." is "CreateRecord." The message can specify that the first and second parameters should not be returned because of the value "0." Further, the "S" and "F" indicate success and failure, respectively, which is returned to a requestor 210. Finally, "John" and "Bates" indicate string values as inputs to the object. Accordingly, by using the example format of the message above, the parameters have been selectively identified for return to the requester in a return list after execution by the remote object. However, in other embodiments, the parameter list can include any number of parameters. Further, although a "0" indicates that a parameter should not be returned, any value can represent a parameter that should not be returned. Thus, any format can exist for the parameter list, as long as the requestor can invoke a remote object with parameters that have been identified for selective return.

Figure 2B:
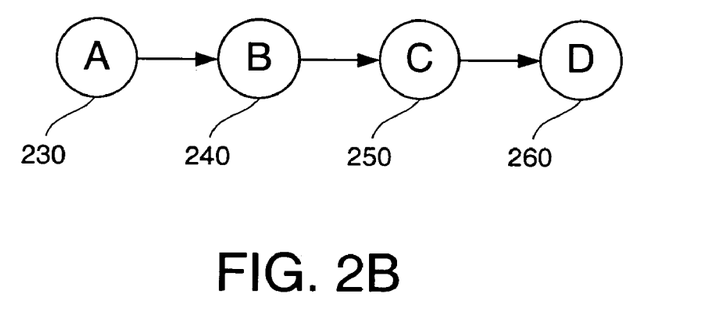
FIG. 2B is a flowchart diagram illustrating the invocation of a remote object, in accordance with an embodiment of the invention.

The requestor 210, such as a system process, on one system can transmit the message to an invoked object 220 on another system. After executing the method, the method returns selected parameters in the message to the requestor 210. For example, FIG. 2B is a flowchart diagram illustrating the invocation of a remote object, in accordance with an embodiment of the invention.

In operation-A 230, the requestor 210 "executes" a method specifying parameters to return in the return list, thus transmitting the message to the invoked object 220. In operation-B 240, the invoked object 220 creates a record using the method "CreateRecord" for "John Bates" by executing the method in operation-C 250. Then, the invoked object 220 returns "Success( )" and "Failure( )" parameters to the requestor 210 in operation-D 260. Specifically, callbacks such as "Success( )" and "Failure( )" can indicate the successful or failed execution of the method "CreateRecord," respectively. In one embodiment, the requestor 210 and the object 220 can exist on different systems. However, in another embodiment, the requestor 210 and the invoked object 220 can exist on the same system, as long as the invoked object 220 is capable of returning selected parameters to the requestor 210.

Figure 3A:
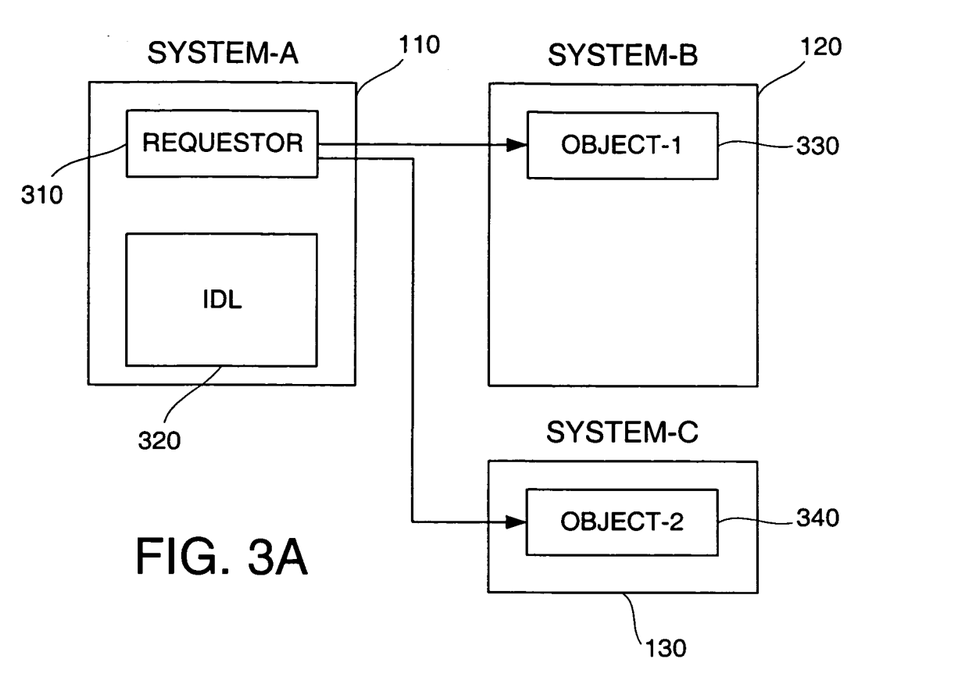
FIG. 3A is a diagram illustrating a requester invoking a remote object in a distributed object computing environment, in accordance with an embodiment of the invention.
Figure 3B:
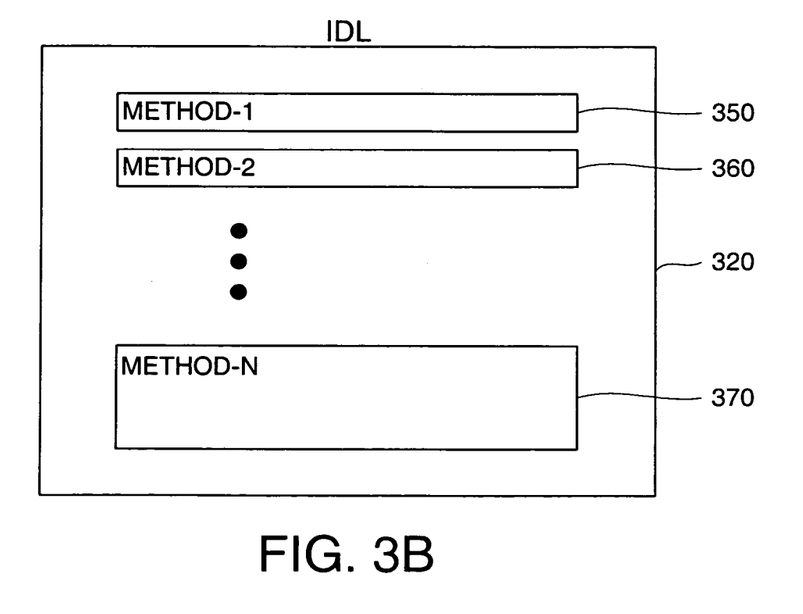
FIG. 3B is a diagram illustrating an interface definition language (IDL) of a requestor, in accordance with an embodiment of the invention.

FIG. 3A is a diagram illustrating a requestor invoking a remote object in a distributed object computing environment, in accordance with an embodiment of the invention. In an alternative embodiment of a requester 310 and an interface definition language (IDL) 320 in the system-A 110, the requester 310 can transmit messages to the system-B 120 and the system-C 130. Contained within the system-B 120 and the system-C 130 are an object-1 330 and an object-2 340, respectively. The IDL 320 is capable of providing a lightweight method enabling communication between the requestor 310 and either the object-1 330 or the object-2 340. Particularly, the IDL 320 can specify methods for execution, including the parameters associated with the methods. For example, FIG. 3B is a diagram illustrating an interface definition language (IDL) of a requester, in accordance with an embodiment of the invention. The IDL 320 can include a method-1 350, a method-2 360, and a method-N 370. Thus, the IDL 320 can include any number of methods.

An exemplary embodiment of the method-1 350 is illustrated in Table 1, which specifies a parameter "FirstName" to return to the requestor 310 after executing the method "CreateRecord" associated with an object. Alternatively, the other parameters such as "LastName," "Success( )," and "Failure( )" do not return to the requestor 310.

TABLE 1

| CreateRecord ( | |
|---|---|
| Returns | FirstName (StringValue) |
| | LastName (StringValue) |
| | Success( ) |
| | Failure( )) |

Figure 3C:
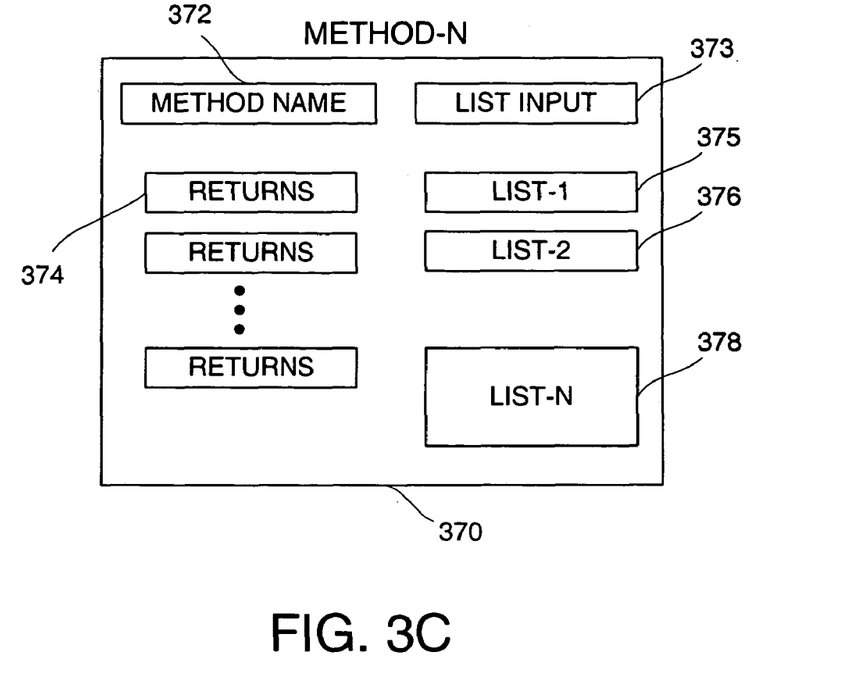
FIG. 3C is a diagram illustrating a method with selective returns, in accordance with an embodiment of the invention.

In another embodiment, FIG. 3C is a diagram illustrating a method with selective returns, in accordance with an embodiment of the invention. Specifically, the method-N 370 can include a method name 372, a list input 373, a returns identifier 374, and parameter lists such as a list-1 375, a list-2 376, and a list-N 378. The method name 372 is a name such as "CreateRecord," as illustrated in Table 1, corresponding to a method associated with an object, such as the object-1 330. The list input 373 represents the input parameters sent to the object-1 330. Further, each of the returns identifiers 374 indicates that the list-1 375, the list-2 376, and the list-N 378 return to the requestor 310 after the execution of the method.

Each list in the parameter lists can include data parameters of any type and amount. Moreover, each list is shown being identified for selective return to the requestor 310. However, alternative embodiments can identify some of the lists for selective return to the requestor 310. For example, the returns identifier 374 may not precede the list-1 375 and the list-2 376. Thus, only the list-N 378 is identified for selective return to the requestor 310.

Further, a selected return parameter may represent a list of parameters to be returned as a whole. If chosen, the parameter list values would be returned to the requestor either through a callback on the requestor with an equal parameter list, or through a data structure representing the parameter list values.

Figure 3D:
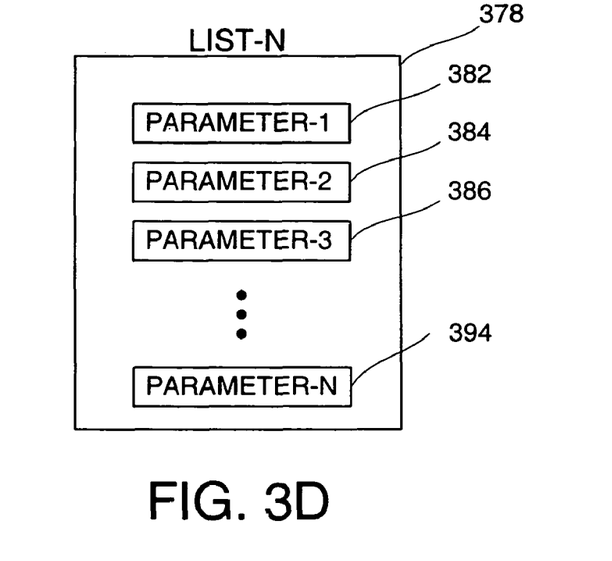
FIG. 3D is a diagram illustrating a parameter list, in accordance with an embodiment of the invention.

FIG. 3D is a diagram illustrating a parameter list, in accordance with an embodiment of the invention. In FIG. 3D, the list-N 378 can include a parameter-1 382, a parameter-2 384, a parameter-3 386, and a parameter-N 394. The parameters can be a string including any character data, such as "John." Further, a parameter can include a number having a value, a success parameter and a failure parameter, which are variables for exception handling. However, the parameters can be any data type, as long as the parameters can be returned to the requester 310.

Thus, regarding FIGS. 3A through 3D, an object can have zero or more methods. The method can have zero or more input parameters and zero or more return cases. Further, the return case can have zero or more output parameters. The requester of an object method chooses zero or more return cases the requestor can handle. Thus, when the object executes the method, zero or more return cases may be appropriate for returning to the requester, regardless of which return cases the requestor chose to handle.

Table 2 illustrates an exemplary method conforming to the illustrations in FIGS. 3B to 3D.

TABLE 2

MethodName (input parameters 0 . . . N1)
    returns return1 (returns parameters 0 . . . N2)
    return2 (returns parameters 0 . . . N3)

The IDL 320 can specify any number of parameters for each parameter list. For example, as shown in Table 2, the parameters can have no parameters or a maximum of N1, N2, or N3 parameters. Thus, by specifying the parameters with the identifier "returns," the executed method associated with an object can return the parameters indicated. For example, "return 1" and "return 2" can return any parameters specified by 0 . . . N2 and 0 . . . N3. However, because the first parameter list 0 . . . N1 is not preceded by the identifier "returns," no parameters from 0 . . . N1 are returned to the requestor 310. In exemplary embodiments, the IDL 320 can be incorporated into an existing interface used in any middleware. In other embodiments, the IDL 320 can be a separate interface for communicating in a distributed computing environment, as long as the interface identifies selected parameters to be returned from the method after execution.

Figure 4:
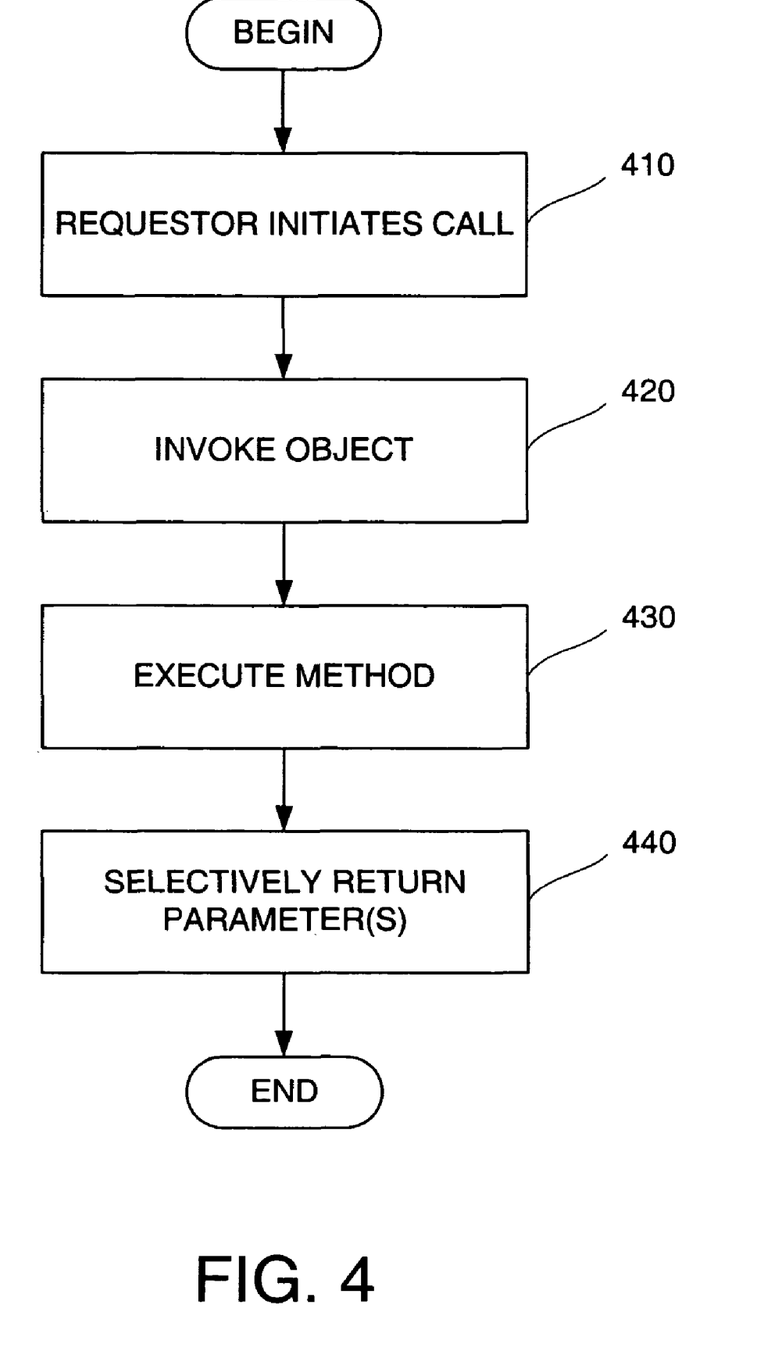
FIG. 4 is a flowchart diagram illustrating a requester invoking a remote object in a distributed object computing environment, in accordance with an embodiment of the invention.

FIG. 4 is a flowchart diagram illustrating a requester invoking a remote object in a distributed object computing environment, in accordance with an embodiment of the invention. Operations to selectively return parameters to an invoker can begin with operation 410. For example, the requestor 210 (FIG. 2) can initiate a call by transmitting a message to the invoked object 220. The message can have a format corresponding to the exemplary message "c.r.(0, 0, S, F, "John," "Bates")" as previously described in FIG. 2A. The message is generated from an interface, such as the IDL 320. Within the IDL 320 are lightweight methods with parameters in a parameter list. Associated with the parameter list are a number of the parameters identified for selective return after the execution of the method associated with the remote object. The requestor 210 uses the IDL 320 by executing the lightweight methods specifying selected parameters to return. Then, in operation 420, the message invokes an object. Consequently, in operation 430, the method specified in the IDL 320 is executed, and after creating callbacks for the returned parameters, the invoked object 220 selectively returns parameters in operation 440 as results.

All of the selected return parameters may not be returned. The execution of the method determines which, if any, of the selected parameters will be returned. For example, a subset of the selected parameters (zero or more) may be returned. Further, only the selected return parameters previously identified in the interface are capable of being returned to the requestor 210 as results. Thus, when the requester 210 selects a return parameter, the selection only informs the invoked object 220 which return parameters the requester 210 is capable of handling. Subsequently, the operations end. Accordingly, returning to Table 2, the invoked object 220 is capable of returning the "return1" and the "return2" parameters as results to the requestor 210.

An exemplary embodiment of an object and a method is illustrated in Table 3.

TABLE 3

Object:
// GetName takes a Number id as input
// GetName returns Name and Success if id is found; otherwise, Failure.
Method GetName(Number id)
    returns Name(string first, string last)
    returns Success( )
    returns Failure( )
Method:
Object.GetName(return Name?, return Success?, return Failure?, Number)

For example, if the requestor invokes the object with "Object.GetName(Yes, No, Yes, 118)," then the requester wants to receive "Name," or "Failure", but not "Success." Upon execution of the method of the object, if the input value "118" is found, then "Name(first, last)" is returned to the requester. However, "Success" is not returned because the requester chose "No." If the input value "118" is not found, then "Failure" is returned to the requester. Thus, as illustrated by one exemplary embodiment, many parameters can be selected for return, but any number of parameters can be returned after the invocation of the object. In other exemplary embodiments, any method of selecting parameters to return is possible, as long as the invoked object returns zero or more parameters, which can be a subset of the selected parameters, to the requestor.

Figure 5A:
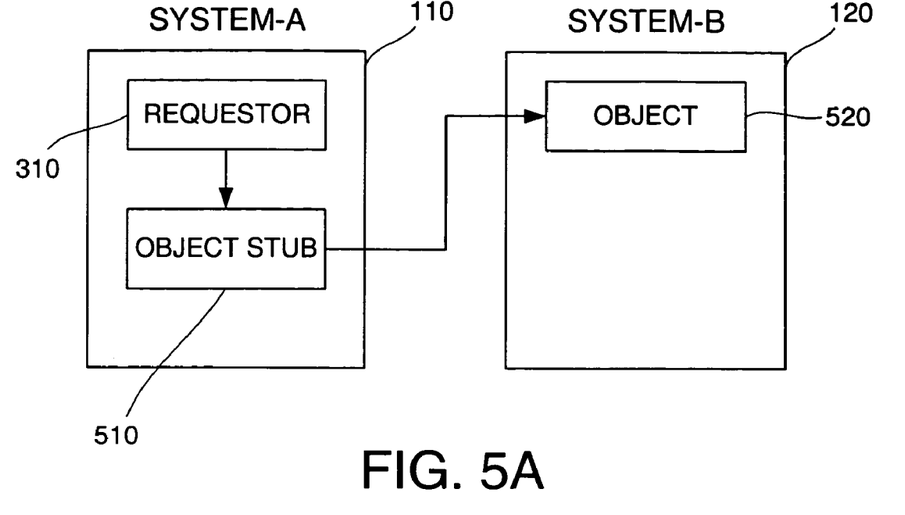
FIG. 5A is another diagram illustrating a requestor invoking a remote object in a distributed object computing environment, in accordance with another embodiment of the invention.

FIG. 5A is another diagram illustrating a requestor invoking a remote object in a distributed object computing environment, in accordance with another embodiment of the invention. For example, in the system-A 110, the requestor 310 (FIG. 3A) can invoke a previously created object stub 510 instead of specifying parameters lists in the IDL 320. The object stub 510 can represent a foreign object 520. The object stub 520 can be used synchronously or asynchronously in the distributed object computing environment to invoke methods associated with the foreign object 520. Specifically, within the object stub 510, the parameters to be returned to the requestor 310 can be specified with the returns identifiers 374 (FIG. 3C). When the parameters return to the requestor 310, the parameters are deposited into the object stub 510. Subsequently, the requestor 310 can indicate to the foreign object 520 that the returns were successful.

Figure 5B:
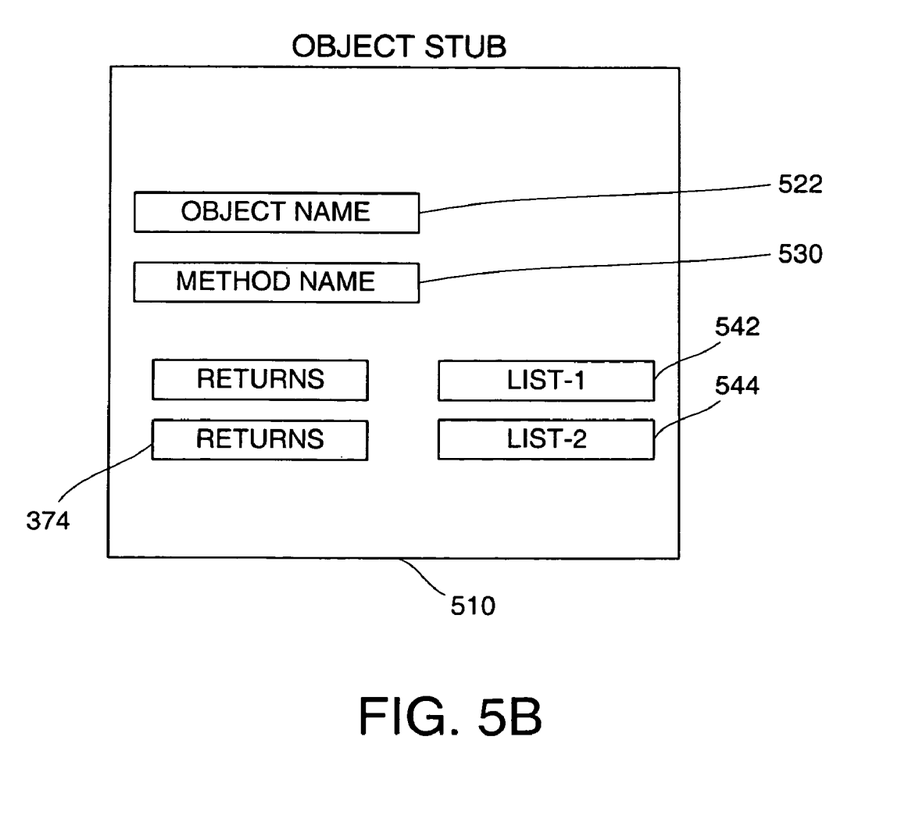
FIG. 5B is a diagram illustrating an object stub, in accordance with another embodiment of the invention.

FIG. 5B is a diagram illustrating an object stub, in accordance with another embodiment of the invention. An embodiment of the object stub 510 can include an object name 522, a method name 530, the returns identifier 374, and parameter lists such as a list-1 542 and a list 544. In contrast with previous embodiments specifying an IDL 320 with methods and parameter lists, the object stub 510 corresponds to the foreign object 520. Thus, the object name 522 is the name of the foreign object 520. In an exemplary embodiment, the list-1 542 can be a success( ) parameter and the list-2 544 can be a failure( ) parameter, thereby obviating the need for callbacks. Thus, because the requestor 310 has access to a local object stub 510, there is no need to create callbacks in the requestor 310 as indicated in FIGS. 2A and 2B.

Figure 6:
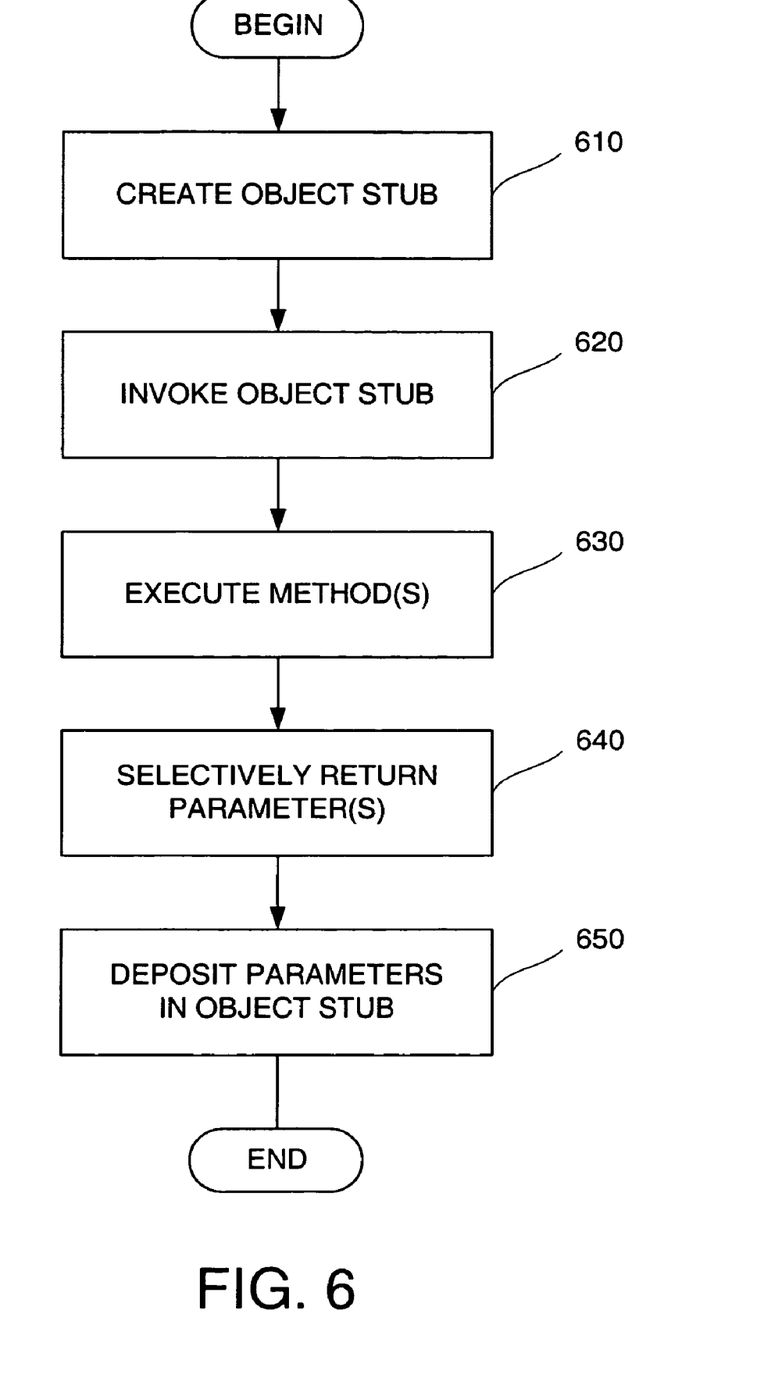
FIG. 6 is a flowchart diagram illustrating a requestor invoking methods in a remote object via an object stub, in accordance with an embodiment of the invention.

FIG. 6 is a flowchart diagram illustrating a requester invoking methods in a remote object via an object stub, in accordance with an embodiment of the invention. Exemplary operations can begin with operation 610, where the object stub 510 is created. Within the object stub are parameters in a parameter list identified for selective return to the requester. Specifically, only the selected return parameters are returned to the requester after the execution of the foreign object 520. Then, in operation 620, the requestor 310 executes the method by invoking the object stub 510. By executing the object stub, a message can be transmitted to the remote object such that the message includes the selected return parameters and remaining parameters not to be returned to the requestor. Consequently, the foreign object 520 executes the method in operation 630. In operation 640, the foreign object 510 then selectively returns parameters to the requester 310 and deposits the parameters into the object stub 510 in operation 650. By depositing the selected return parameters or a subset of the selected return parameters into the object stub, the remote object does not need to create callbacks for the results, as described in FIG. 4. Subsequently, the operations end without the creation of callbacks in the requestor 310.

Other exemplary embodiments are possible for selectively returning parameters to an invoker of an object in a distributed network environment. Specifically, any process to limit network traffic by opting to not receive returned parameters is possible, as long as the requestor invoking an object can determine selected parameters to return.

Those skilled in the art will recognize that the order in which the method operations are performed may be varied from that described herein, e.g., by rearranging the order in which the method operations are performed or by performing some of the method operations in parallel.

Further, a system for invoking methods in a network can include any structure for invoking a method associated with an object and receiving only selected parameters from the object after completing the execution of the method. Exemplary structures can include any network, such as a distributed object computing environment and a standalone computing system. Further, exemplary interfaces such as an IDL and an object stub can define selected parameters of a parameter list to be returned. Further, a message can identify a number of parameters in the parameter list to selectively return to a requestor. However, any structure to invoke methods for selective return of parameters is possible, as long as the parameters are specified for selected return to the requester. Thus, other embodiments can include any equivalent structure for selectively returning parameters after the invocation of the method.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for invoking functions asynchronously in a distributed object computing environment, comprising:

defining an object having a plurality of functions, wherein each function being individually defined with predefined selective returns by return identifiers, for one of the plurality of functions, invoking, by a requestor, the function associated with the object, wherein the function includes a definition of selected parameters of a parameter list of two or more parameters of the function, wherein each parameter of the two or more parameters being individually marked to be returned or not to be returned, wherein the invoking includes return parameters selected by and capable of being handled by the requestor and wherein the invoking causing the function of the object to be executed;

determining, at the object, parameters to be returned, wherein the determined parameters to be returned include those selected to be returned or fewer than those parameters selected to be returned;

creating, at the object, a callback for each determined parameter to be returned;

returning, by the object, only the determined parameters via the created callbacks after completing the execution of the function;

and wherein invoking the function further includes accessing an interface that lists each of the plurality of functions and its predefined selective returns, and each function includes a list of the selected parameters and the individual marking.

2. The method of claim 1, wherein invoking the function further includes listing the two or more parameters in the parameter list.

3. The method of claim 1, wherein invoking the function further includes accessing an object stub created by the requestor.

4. The method of claim 3, further including depositing the parameter list in the object stub.

5. The method of claim 1, wherein executing the function further includes accessing the object in a system.

6. The method of claim 1, wherein the callback identifies the number of parameters returned to the requestor.

7. A method for asynchronously executing requests from an invoker over a network, the invoker originating at a first system on the network, comprising:

at a second system on the network, asynchronously, (a) receiving a request from the invoker through an interface of the invoker, wherein the interface lists a plurality of functions that each include predefined selective returns, and each function includes a parameter list of two or more parameters that were individually marked as return parameters that should be returned or identified as parameters that should not be returned, and wherein the request includes return parameters selected by and capable of being handled by the invoker;

(b) executing one of the functions defined in the interface in response to receiving the request from the invoker;

(c) determining, at the object, parameters to be returned, wherein the determined parameters to be returned include those selected to be returned or fewer than those parameters selected to be returned;

(d) creating a callback for each determined parameter to be returned; and (e) returning only the determined parameters via the created callbacks after completing the execution of the function, wherein the executed request can produce results that are returned based on the individual marking of the return parameters in the parameter list and only for functions predefined to selectively return results.

8. The method of claim 7, wherein receiving the request further includes identifying a method name corresponding to a method associated with an object.

9. The method of claim 7, further comprising, depositing identified return parameters to an object stub.

* * * * *